US010443585B2

(12) United States Patent
Schroeder et al.

(10) Patent No.: US 10,443,585 B2
(45) Date of Patent: Oct. 15, 2019

(54) PUMP FOR A HEAT PUMP SYSTEM

(71) Applicant: Haier US Appliance Solutions, Inc., Wilmington, DE (US)

(72) Inventors: Michael Goodman Schroeder, Louisville, KY (US); Yefim Tsozik, Louisville, KY (US); Michael Alexander Benedict, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 118 days.

(21) Appl. No.: 15/248,152

(22) Filed: Aug. 26, 2016

(65) Prior Publication Data

US 2018/0058728 A1 Mar. 1, 2018

(51) Int. Cl.
| F25B 1/02 | (2006.01) |
| F04B 9/04 | (2006.01) |
| F04B 1/04 | (2006.01) |
| F25B 21/00 | (2006.01) |

(52) U.S. Cl.
CPC ............ *F04B 9/042* (2013.01); *F04B 1/0413* (2013.01); *F04B 1/0426* (2013.01); *F04B 9/047* (2013.01); *F25B 21/00* (2013.01); *F25B 2321/0021* (2013.01); *F25B 2321/0022* (2013.01); *Y02B 30/66* (2013.01)

(58) Field of Classification Search
CPC .. F25B 1/02; F25B 1/005; F25B 30/02; F04B 1/0448; F04B 9/042; F04B 1/0408; F04B 1/0426
See application file for complete search history.

(56) References Cited

U.S. PATENT DOCUMENTS

| 668,560 A | 2/1901 | Fulner et al. |
| 1,985,455 A | 12/1934 | Mosby |
| 2,671,929 A | 3/1954 | Gayler |
| 2,765,633 A | 10/1956 | Muffly |
| 3,816,029 A * | 6/1974 | Bowen ..................... F03C 1/08 417/223 |
| 3,956,076 A | 5/1976 | Powell, Jr. et al. |
| 4,037,427 A | 7/1977 | Kramer |

(Continued)

FOREIGN PATENT DOCUMENTS

| CA | 2893874 A1 | 6/2014 |
| CA | 2919117 A1 | 1/2015 |

(Continued)

OTHER PUBLICATIONS

International Search Report and Written Opinion issued in connection with PCT Application No. PCT/US2014/042485 dated Oct. 31, 2014.

(Continued)

*Primary Examiner* — Brian M King
(74) *Attorney, Agent, or Firm* — Dority & Manning, P.A.

(57) ABSTRACT

A pump for a heat pump system includes a piston having a cam follower positioned on a bearing surface of a cam. A casing includes a first casing portion and a second casing that are mounted to each other. A piston head of the piston is disposed within the first casing portion, and the piston extends through the second casing portion. A spring urges the cam follower of the piston towards the bearing surface of the cam.

18 Claims, 10 Drawing Sheets

(56) References Cited

U.S. PATENT DOCUMENTS

| | | |
|---|---|---|
| 4,102,655 A | 7/1978 | Jeffery et al. |
| 4,107,935 A | 8/1978 | Steyert, Jr. |
| 4,197,709 A | 4/1980 | Hochstein |
| 4,200,680 A | 4/1980 | Sasazawa et al. |
| 4,259,843 A | 4/1981 | Kausch |
| 4,507,927 A | 4/1985 | Barclay |
| 4,507,928 A | 4/1985 | Johnson |
| 4,549,155 A | 10/1985 | Halbach |
| 4,554,790 A | 11/1985 | Nakagome et al. |
| 4,557,228 A * | 12/1985 | Samodovitz ............ F02B 75/38 123/78 E |
| 4,599,866 A | 7/1986 | Nakagome et al. |
| 4,625,519 A | 12/1986 | Hakuraku et al. |
| 4,642,994 A | 2/1987 | Barclay et al. |
| 4,735,062 A | 4/1988 | Woolley et al. |
| 4,741,175 A | 5/1988 | Schulze |
| 4,785,636 A | 11/1988 | Hakuraku et al. |
| 4,796,430 A | 1/1989 | Malaker et al. |
| 5,091,361 A | 2/1992 | Hed |
| 5,156,003 A | 10/1992 | Yoshiro et al. |
| 5,249,424 A | 10/1993 | DeGregoria et al. |
| 5,336,421 A | 8/1994 | Kurita et al. |
| 5,351,791 A | 10/1994 | Rosenzweig |
| 5,465,781 A | 11/1995 | DeGregoria |
| 5,599,177 A * | 2/1997 | Hetherington .......... F04B 9/133 417/429 |
| 5,661,895 A * | 9/1997 | Irgens .................... F02M 51/04 137/625.65 |
| 5,718,570 A * | 2/1998 | Beckett ................... F16H 39/10 137/625.21 |
| 5,934,078 A | 8/1999 | Lawton, Jr. et al. |
| 6,332,323 B1 | 12/2001 | Reid et al. |
| 6,423,255 B1 | 7/2002 | Hoechsmann et al. |
| 6,446,441 B1 | 9/2002 | Dean |
| 6,467,274 B2 | 10/2002 | Barclay et al. |
| 6,526,759 B2 | 3/2003 | Zimm et al. |
| 6,588,215 B1 | 7/2003 | Ghoshal |
| 6,612,816 B1 | 9/2003 | Vanden Brande et al. |
| 6,668,560 B2 | 12/2003 | Zimm et al. |
| 6,826,915 B2 | 12/2004 | Wada et al. |
| 6,915,647 B2 | 7/2005 | Tsuchikawa et al. |
| 6,935,121 B2 | 8/2005 | Fang et al. |
| 6,946,941 B2 | 9/2005 | Chell |
| 6,971,245 B2 | 12/2005 | Kuroyanagi |
| 7,148,777 B2 | 12/2006 | Chell et al. |
| 7,297,270 B2 | 11/2007 | Bernard et al. |
| 7,313,926 B2 | 1/2008 | Gurin |
| 7,481,064 B2 | 1/2009 | Kitanovski et al. |
| 7,552,592 B2 | 6/2009 | Iwasaki et al. |
| 7,644,588 B2 | 1/2010 | Shin |
| 7,863,789 B2 | 1/2011 | Zepp et al. |
| 7,897,898 B2 | 3/2011 | Muller et al. |
| 7,938,632 B2 * | 5/2011 | Smith ..................... F04B 9/042 417/415 |
| 8,061,147 B2 | 11/2011 | Dinesen et al. |
| 8,069,662 B1 | 12/2011 | Albert |
| 8,099,964 B2 | 1/2012 | Saito et al. |
| 8,174,245 B2 | 5/2012 | Carver |
| 8,191,375 B2 | 6/2012 | Sari et al. |
| 8,209,988 B2 | 7/2012 | Zhang et al. |
| 8,216,396 B2 | 7/2012 | Dooley et al. |
| 8,310,325 B2 | 11/2012 | Zhang et al. |
| 8,375,727 B2 | 2/2013 | Sohn |
| 8,378,769 B2 | 2/2013 | Heitzler et al. |
| 8,448,453 B2 | 5/2013 | Bahl et al. |
| 8,551,210 B2 | 10/2013 | Reppel et al. |
| 8,596,084 B2 | 12/2013 | Herrera et al. |
| 8,616,009 B2 | 12/2013 | Dinesen et al. |
| 8,656,725 B2 | 2/2014 | Muller et al. |
| 8,695,354 B2 | 4/2014 | Heitzler et al. |
| 8,729,718 B2 | 5/2014 | Kuo et al. |
| 8,763,407 B2 | 7/2014 | Carroll et al. |
| 8,769,966 B2 | 7/2014 | Heitzler et al. |
| 8,869,541 B2 | 10/2014 | Heitzler et al. |
| 8,904,806 B2 | 12/2014 | Cramet et al. |
| 8,935,927 B2 | 1/2015 | Kobayashi et al. |
| 9,175,885 B2 | 11/2015 | Katter |
| 9,245,673 B2 | 1/2016 | Carroll et al. |
| 9,377,221 B2 | 6/2016 | Benedict |
| 9,400,126 B2 | 7/2016 | Takahashi et al. |
| 9,523,519 B2 | 12/2016 | Muller |
| 9,534,817 B2 | 1/2017 | Benedict et al. |
| 9,548,151 B2 | 1/2017 | Muller |
| 9,599,374 B2 | 3/2017 | Takahashi et al. |
| 9,631,843 B2 | 4/2017 | Benedict |
| 9,702,594 B2 | 7/2017 | Vetrovec |
| 9,739,510 B2 | 8/2017 | Hassen |
| 9,797,630 B2 | 10/2017 | Benedict et al. |
| 9,810,454 B2 | 11/2017 | Tasaki et al. |
| 9,857,105 B1 | 1/2018 | Schroeder et al. |
| 9,857,106 B1 | 1/2018 | Schroeder et al. |
| 9,927,155 B2 | 3/2018 | Boeder et al. |
| 9,978,487 B2 | 5/2018 | Katter et al. |
| 10,006,675 B2 | 6/2018 | Benedict et al. |
| 10,018,385 B2 | 7/2018 | Radermacher et al. |
| 2002/0040583 A1 | 4/2002 | Barclay et al. |
| 2002/0066368 A1 | 6/2002 | Zornes |
| 2003/0010054 A1 | 1/2003 | Esch et al. |
| 2003/0051774 A1 | 3/2003 | Saito |
| 2004/0093877 A1 | 5/2004 | Wada |
| 2004/0182086 A1 | 9/2004 | Chiang et al. |
| 2004/0187510 A1 | 9/2004 | Jung |
| 2004/0187803 A1 | 9/2004 | Regev |
| 2004/0250550 A1 | 12/2004 | Bruck |
| 2005/0109490 A1 | 5/2005 | Harmon et al. |
| 2005/0274676 A1 | 12/2005 | Kumar et al. |
| 2006/0130518 A1 | 6/2006 | Kang et al. |
| 2006/0231163 A1 | 10/2006 | Hirosawa et al. |
| 2007/0130960 A1 | 6/2007 | Muller et al. |
| 2007/0220901 A1 | 9/2007 | Kobayashi |
| 2008/0236171 A1 | 10/2008 | Saito et al. |
| 2008/0236175 A1 | 10/2008 | Chaparro Monferrer et al. |
| 2008/0303375 A1 | 12/2008 | Carver |
| 2009/0091411 A1 | 4/2009 | Zhang et al. |
| 2009/0158749 A1 | 6/2009 | Sandeman |
| 2009/0217674 A1 | 9/2009 | Kaji et al. |
| 2009/0236930 A1 | 9/2009 | Nashiki |
| 2009/0266083 A1 | 10/2009 | Shin et al. |
| 2009/0308080 A1 | 12/2009 | Han et al. |
| 2010/0000228 A1 | 1/2010 | Wiest et al. |
| 2010/0058775 A1 | 3/2010 | Kaji et al. |
| 2010/0071383 A1 | 3/2010 | Zhang et al. |
| 2010/0116471 A1 | 5/2010 | Reppel |
| 2010/0122488 A1 | 5/2010 | Fukai |
| 2010/0162747 A1 | 7/2010 | Hamel et al. |
| 2010/0209084 A1 | 8/2010 | Nelson et al. |
| 2010/0236258 A1 | 9/2010 | Heitzler et al. |
| 2010/0276627 A1 | 11/2010 | Mazet |
| 2010/0303917 A1 | 12/2010 | Watson et al. |
| 2011/0000206 A1 | 1/2011 | Aprad |
| 2011/0042608 A1 | 2/2011 | Reesink |
| 2011/0048031 A1 | 3/2011 | Barve |
| 2011/0048690 A1 | 3/2011 | Reppel et al. |
| 2011/0058795 A1 | 3/2011 | Kleman et al. |
| 2011/0061398 A1 | 3/2011 | Shih et al. |
| 2011/0062821 A1 | 3/2011 | Chang et al. |
| 2011/0082026 A1 | 4/2011 | Sakatani et al. |
| 2011/0162388 A1 | 7/2011 | Barve et al. |
| 2011/0168363 A9 | 7/2011 | Reppel et al. |
| 2011/0173993 A1 | 7/2011 | Muller et al. |
| 2011/0182086 A1 | 7/2011 | Mienko et al. |
| 2011/0192836 A1 | 8/2011 | Muller et al. |
| 2011/0218921 A1 | 9/2011 | Addala et al. |
| 2011/0239662 A1 | 10/2011 | Bahl et al. |
| 2011/0284196 A1 | 11/2011 | Zanadi |
| 2011/0302931 A1 | 12/2011 | Sohn |
| 2011/0308258 A1 | 12/2011 | Smith et al. |
| 2011/0314836 A1 | 12/2011 | Heitzler et al. |
| 2012/0031108 A1 | 2/2012 | Kobayashi et al. |
| 2012/0033002 A1 | 2/2012 | Seeler et al. |
| 2012/0036868 A1 | 2/2012 | Heitzler et al. |
| 2012/0045698 A1 | 2/2012 | Shima |
| 2012/0079834 A1 | 4/2012 | Dinesen |

(56) References Cited

U.S. PATENT DOCUMENTS

| | | |
|---|---|---|
| 2012/0222427 A1 | 9/2012 | Hassen |
| 2012/0222428 A1 | 9/2012 | Celik et al. |
| 2012/0266591 A1 | 10/2012 | Morimoto et al. |
| 2012/0266607 A1 | 10/2012 | Morimoto et al. |
| 2012/0267090 A1 | 10/2012 | Kruglick |
| 2012/0272665 A1 | 11/2012 | Watanabe et al. |
| 2012/0272666 A1 | 11/2012 | Watanabe |
| 2012/0285179 A1 | 11/2012 | Morimoto |
| 2012/0291453 A1 | 11/2012 | Watanabe et al. |
| 2013/0019610 A1 | 1/2013 | Zimm et al. |
| 2013/0020529 A1 | 1/2013 | Chang et al. |
| 2013/0104568 A1 | 5/2013 | Kuo et al. |
| 2013/0106116 A1 | 5/2013 | Kuo et al. |
| 2013/0145573 A1 | 6/2013 | Bizhanzadeh |
| 2013/0180263 A1 | 7/2013 | Choi et al. |
| 2013/0186107 A1 | 7/2013 | Shih et al. |
| 2013/0187077 A1 | 7/2013 | Katter |
| 2013/0192269 A1 | 8/2013 | Wang |
| 2013/0199460 A1 | 8/2013 | Duplessis et al. |
| 2013/0227965 A1 | 9/2013 | Yagi et al. |
| 2013/0232993 A1 | 9/2013 | Saito et al. |
| 2013/0255279 A1 | 10/2013 | Tomimatsu et al. |
| 2013/0269367 A1 | 10/2013 | Meillan |
| 2013/0298571 A1 | 11/2013 | Morimoto et al. |
| 2013/0300243 A1 | 11/2013 | Gieras et al. |
| 2013/0319012 A1 | 12/2013 | Kuo et al. |
| 2013/0327062 A1 | 12/2013 | Watanabe et al. |
| 2014/0020881 A1 | 1/2014 | Reppel et al. |
| 2014/0075958 A1 | 3/2014 | Takahashi et al. |
| 2014/0116538 A1 | 5/2014 | Tanaka et al. |
| 2014/0165594 A1 | 6/2014 | Benedict |
| 2014/0165595 A1 | 6/2014 | Zimm et al. |
| 2014/0190182 A1 | 7/2014 | Benedict |
| 2014/0216057 A1 | 8/2014 | Oezcan |
| 2014/0260373 A1 | 9/2014 | Gerber et al. |
| 2014/0290273 A1 | 10/2014 | Benedict et al. |
| 2014/0290275 A1 | 10/2014 | Muller |
| 2014/0291570 A1 | 10/2014 | Klausner et al. |
| 2014/0305137 A1 | 10/2014 | Benedict |
| 2014/0305139 A1 | 10/2014 | Takahashi et al. |
| 2014/0325996 A1 | 11/2014 | Muller |
| 2014/0366557 A1 | 12/2014 | Mun et al. |
| 2015/0007582 A1 | 1/2015 | Kim et al. |
| 2015/0027133 A1 | 1/2015 | Benedict |
| 2015/0030483 A1 | 1/2015 | Ryu |
| 2015/0033762 A1 | 2/2015 | Cheng et al. |
| 2015/0033763 A1 | 2/2015 | Saito et al. |
| 2015/0047371 A1 | 2/2015 | Hu et al. |
| 2015/0068219 A1 | 3/2015 | Komorowski et al. |
| 2015/0089960 A1 | 4/2015 | Takahashi et al. |
| 2015/0114007 A1 | 4/2015 | Neilson et al. |
| 2015/0168030 A1 | 6/2015 | Leonard et al. |
| 2015/0211440 A1 | 7/2015 | Joffroy |
| 2015/0260433 A1 | 9/2015 | Choi et al. |
| 2015/0267943 A1 | 9/2015 | Kim et al. |
| 2015/0362225 A1 | 12/2015 | Schwartz |
| 2015/0369524 A1 | 12/2015 | Ikegami et al. |
| 2016/0000999 A1* | 1/2016 | Focht ............... A61M 5/16831 604/500 |
| 2016/0084544 A1 | 3/2016 | Radermacher et al. |
| 2016/0091227 A1 | 3/2016 | Leonard et al. |
| 2016/0216012 A1 | 7/2016 | Benedict et al. |
| 2016/0238287 A1 | 8/2016 | Benedict |
| 2016/0282021 A1 | 9/2016 | Zhao et al. |
| 2016/0355898 A1 | 12/2016 | Vieyra Villegas et al. |
| 2016/0356529 A1 | 12/2016 | Humburg |
| 2016/0367982 A1 | 12/2016 | Pennie |
| 2017/0059213 A1 | 3/2017 | Barclay et al. |
| 2017/0071234 A1 | 3/2017 | Garg |
| 2017/0138648 A1 | 5/2017 | Cui et al. |
| 2017/0176083 A1 | 6/2017 | Sul et al. |
| 2017/0328603 A1 | 11/2017 | Barclay et al. |
| 2017/0328649 A1 | 11/2017 | Brandmeier |
| 2017/0370624 A1 | 12/2017 | Zimm et al. |
| 2018/0005735 A1 | 1/2018 | Scharf et al. |
| 2018/0023852 A1 | 1/2018 | Schroeder et al. |

FOREIGN PATENT DOCUMENTS

| | | |
|---|---|---|
| CN | 101979937 A | 2/2011 |
| CN | 201772566 U | 3/2011 |
| CN | 101788207 B | 9/2011 |
| CN | 202432596 U | 9/2012 |
| CN | 103090583 A | 5/2013 |
| CN | 103712401 A | 4/2014 |
| CN | 102077303 B | 4/2015 |
| CN | 106481842 A | 3/2017 |
| DE | 102013223959 A1 | 5/2015 |
| DE | 202015106851 U1 | 3/2016 |
| EP | 0187078 A1 | 7/1986 |
| EP | 2071255 A1 | 6/2009 |
| EP | 2108904 A1 | 10/2009 |
| EP | 2215955 A1 | 8/2010 |
| EP | 2322072 A2 | 5/2011 |
| EP | 3306082 A2 | 4/2018 |
| FR | 2935468 A1 | 3/2010 |
| JP | 59232922 | 12/1984 |
| JP | H08166182 A | 6/1996 |
| JP | 3205196 B2 | 9/2001 |
| JP | 2002315243 A | 10/2002 |
| JP | 2007147136 A | 6/2007 |
| JP | 2007291437 A | 11/2007 |
| JP | 2008051412 A | 3/2008 |
| JP | 2010112606 A | 5/2010 |
| JP | 2010525291 A | 7/2010 |
| JP | 6212955 B2 | 12/2014 |
| JP | 2014228216 A | 12/2014 |
| JP | 6079498 B2 | 2/2017 |
| JP | 2017207222 A | 11/2017 |
| KR | 101100301 B1 | 12/2011 |
| KR | 1238234 B1 | 3/2013 |
| WO | WO0212800 A1 | 2/2002 |
| WO | WO03016794 A1 | 2/2003 |
| WO | WO2004/068512 | 8/2004 |
| WO | WO2007/036729 A1 | 4/2007 |
| WO | WO 2009/024412 | 2/2009 |
| WO | WO2010/119591 A1 | 10/2010 |
| WO | WO2011034594 A1 | 3/2011 |
| WO | WO2014099199 A1 | 6/2014 |
| WO | WO2014170447 A1 | 10/2014 |
| WO | WO2014173787 A1 | 10/2014 |
| WO | WO2015017230 A1 | 2/2015 |
| WO | WO2016035267 A1 | 3/2016 |
| WO | WO2017042266 A1 | 3/2017 |
| WO | WO2017097989 A1 | 6/2017 |

OTHER PUBLICATIONS

International Search Report and Written Opinion issued in connection with PCT Application No. PCT/US2014/017431 dated May 16, 2014.

International search report issued in connection with PCT/US2013/070518, dated Jan. 30, 2014.

Tetsuji Okamura, Performance of a room-temperature rotary magnet refrigerator, dated Nov. 28, 2005, Elsevier.

Andrej Kitanovski, Present and future caloric refrigeration and heat-pump technologies, International Journal of Refrigeration, vol. 57, Sep. 2015, pp. 288-298.

Journal of Alloys and Compounds, copyright 2008 Elsevier B.. V. Evaluation of Ni—Mn—In—Si Alloys for Magnetic Refrigerant Application, Rahul Das, A. Perumal and A. Srinivasan, Dept. of Physics, Indian Institute of Technology, Oct. 10, 2011.

Effects of annealing on the magnetic entropy change and exchange bias behavior in melt spun Ni—Mn—In ribbons, X.Z. Zhao, C.C. Hsieh, et al Science Direct, Scripta Materialia 63 (2010).

PCT International Search Report and Written Opinion issued in connection with PCT Application No. PCT/US2013/070023 dated Feb. 27, 2014.

(56) References Cited

OTHER PUBLICATIONS

Barbara Pulko, Epoxy-bonded La—Fe—Co—Si magnetocaloric plates, Journal of Magnetism and Magnetic Materials, 375 (2015) 65-73.
International Search Report of PCT/US2014/047925 dated Nov. 10, 2014.
C Aprea, et al., An innovative rotary permanent magnet magnetic refrigerator based on AMR cycle, Thermal Energy Systems: Production, Storage, Utilization and the Environment, dated May 2015, Napoli, Italy, pp. 1-5.

* cited by examiner

PUMP FOR A HEAT PUMP SYSTEM

FIELD OF THE INVENTION

The subject matter of the present disclosure relates generally to caloric heat pump systems, such as magneto-caloric heat pump systems.

BACKGROUND OF THE INVENTION

Conventional refrigeration technology typically utilizes a heat pump that relies on compression and expansion of a fluid refrigerant to receive and reject heat in a cyclic manner so as to effect a desired temperature change or i.e. transfer heat energy from one location to another. This cycle can be used to provide e.g., for the receiving of heat from a refrigeration compartment and the rejecting of such heat to the environment or a location that is external to the compartment. Other applications include air conditioning of residential or commercial structures. A variety of different fluid refrigerants have been developed that can be used with the heat pump in such systems.

While improvements have been made to such heat pump systems that rely on the compression of fluid refrigerant, at best such can still only operate at about forty-five percent or less of the maximum theoretical Carnot cycle efficiency. Also, some fluid refrigerants have been discontinued due to environmental concerns. The range of ambient temperatures over which certain refrigerant-based systems can operate may be impractical for certain locations. Other challenges with heat pumps that use a fluid refrigerant exist as well.

Magneto-caloric materials (MCMs), i.e. materials that exhibit the magneto-caloric effect, provide a potential alternative to fluid refrigerants for heat pump applications. In general, the magnetic moments of an MCM will become more ordered under an increasing, externally applied magnetic field and cause the MCM to generate heat. Conversely, decreasing the externally applied magnetic field will allow the magnetic moments of the MCM to become more disordered and allow the MCM to absorb heat. Some MCMs exhibit the opposite behavior, i.e. generating heat when the magnetic field is removed (which are sometimes referred to as para-magneto-caloric material but both types are referred to collectively herein as magneto-caloric material or MCM). The theoretical Carnot cycle efficiency of a refrigeration cycle based on an MCM can be significantly higher than for a comparable refrigeration cycle based on a fluid refrigerant. As such, a heat pump system that can effectively use an MCM would be useful.

Challenges exist to the practical and cost competitive use of an MCM, however. In addition to the development of suitable MCMs, equipment that can attractively utilize an MCM is still needed. Currently proposed equipment may require relatively large and expensive magnets, may be impractical for use in e.g., appliance refrigeration, and may not otherwise operate with enough efficiency to justify capital cost.

Accordingly, a heat pump system that can address certain challenges, such as those identified above, would be useful. Such a heat pump system that can also be used in e.g., a refrigerator appliance would also be useful.

BRIEF DESCRIPTION OF THE INVENTION

The present subject matter provides a pump for a heat pump system. The pump includes a piston having a cam follower positioned on a bearing surface of a cam. A casing includes a first casing portion and a second casing that are mounted to each other. A piston head of the piston is disposed within the first casing portion, and the piston extends through the second casing portion. A spring urges the cam follower of the piston towards the bearing surface of the cam. Additional aspects and advantages of the invention will be set forth in part in the following description, or may be apparent from the description, or may be learned through practice of the invention.

In a first exemplary embodiment, a pump for a heat pump system is provided. The pump includes a cam having a bearing surface. A piston extends between a piston head and a cam follower along an axial direction. The cam follower of the piston is positioned on the bearing surface of the cam. A casing includes a first casing portion and a second casing that are mounted to each other. The first casing portion defines a chamber. The piston head of the piston is disposed within the first casing portion at the chamber. The piston extends through the second casing portion between the piston head and the cam follower of the piston along the axial direction. A spring is disposed within the casing and coupled to the piston such that the spring urges the cam follower of the piston towards the bearing surface of the cam.

In a second exemplary embodiment, a caloric heat pump system is provided. The caloric heat pump system includes a regenerator housing that defines a chamber. A stage includes a caloric material disposed within the chamber. A pump is operable to circulate a working fluid through the stage. The pump includes a cam having a bearing surface. A piston extends between a piston head and a cam follower along an axial direction. The cam follower of the piston is positioned on the bearing surface of the cam. A casing includes a first casing portion and a second casing that are mounted to each other. The first casing portion defines a chamber. The piston head of the piston is disposed within the first casing portion at the chamber. The piston extends through the second casing portion along the axial direction. A spring is disposed within the casing and is coupled to the piston such that the spring urges the cam follower of the piston towards the bearing surface of the cam.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
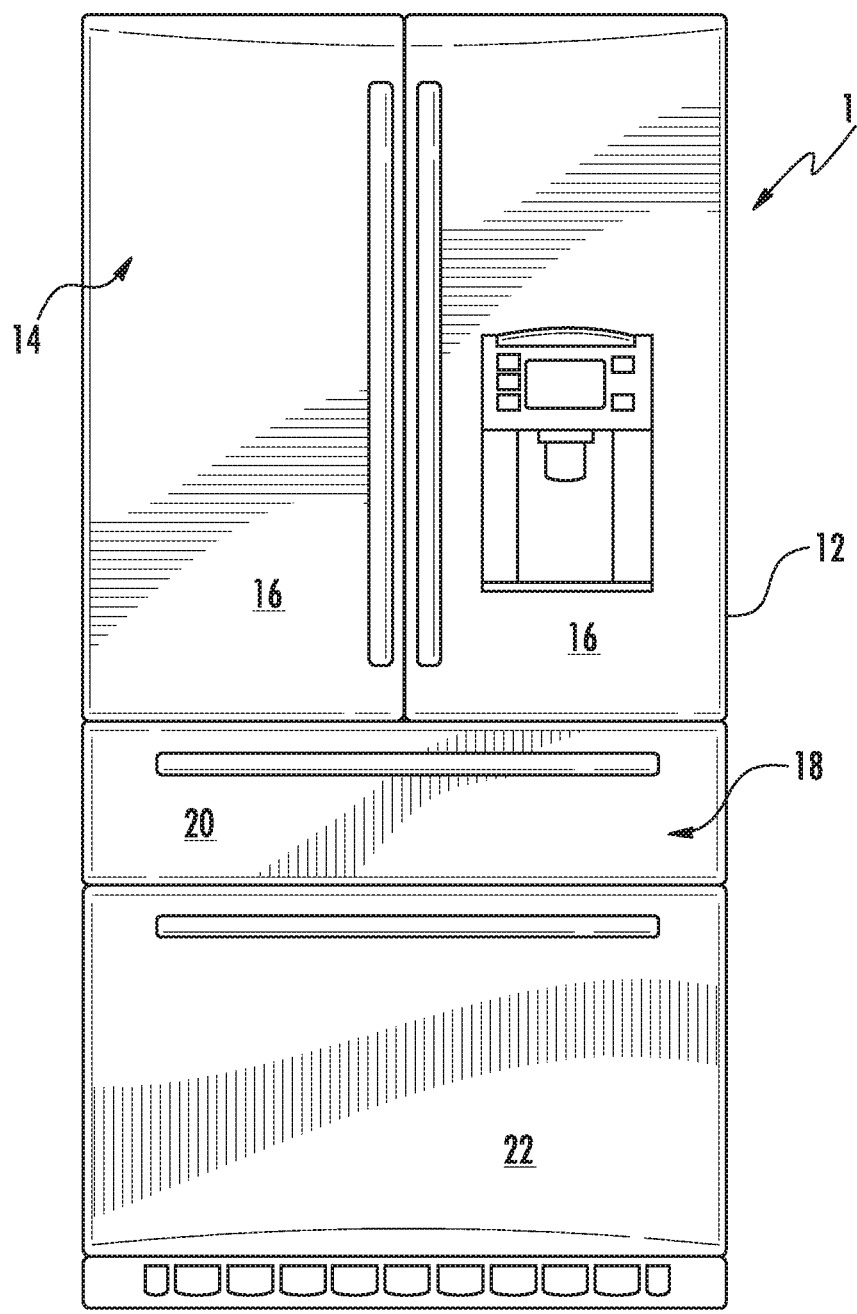
FIG. 1 is a refrigerator appliance in accordance with an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present subject matter is directed to a caloric heat pump system for heating or cooling an appliance, such as a refrigerator appliance. While described in greater detail below in the context of a magneto-caloric heat pump system, one of skill in the art using the teachings herein will recognize that other suitable caloric materials may be used in a similar manner to heat or cool an appliance, i.e., apply a field, move heat, remove the field, move heat. For example, electro-caloric material heats up and cools down within increasing and decreasing electric fields. As another example, elasto-caloric material heats up and cools down when exposed to increasing and decreasing mechanical strain. As yet another example, baro-caloric material heats up and cools down when exposed to increasing and decreasing pressure. Such materials and other similar caloric materials may be used in place of or in addition to the magneto-caloric material described below to heat or cool water within an appliance. Thus, caloric material is used broadly herein to encompass materials that undergo heating or cooling when exposed to a changing field from a field generator, where the field generator may be a magnet, an electric field generator, an actuator for applying mechanical stress or pressure, etc.

Referring now to FIG. 1, an exemplary embodiment of a refrigerator appliance 10 is depicted as an upright refrigerator having a cabinet or casing 12 that defines a number of internal storage compartments or chilled chambers. In particular, refrigerator appliance 10 includes upper fresh-food compartments 14 having doors 16 and lower freezer compartment 18 having upper drawer 20 and lower drawer 22. Drawers 20, 22 are "pull-out" type drawers in that they can be manually moved into and out of freezer compartment 18 on suitable slide mechanisms. Refrigerator 10 is provided by way of example only. Other configurations for a refrigerator appliance may be used as well including appliances with only freezer compartments, only chilled compartments, or other combinations thereof different from that shown in FIG. 1. In addition, the heat pump and heat pump system of the present disclosure is not limited to refrigerator appliances and may be used in other applications as well such as e.g., air-conditioning, electronics cooling devices, and others. Thus, it should be understood that while the use of a heat pump and heat pump system to provide cooling within a refrigerator is provided by way of example herein, the present disclosure may also be used to provide for heating applications as well.

Figure 2:
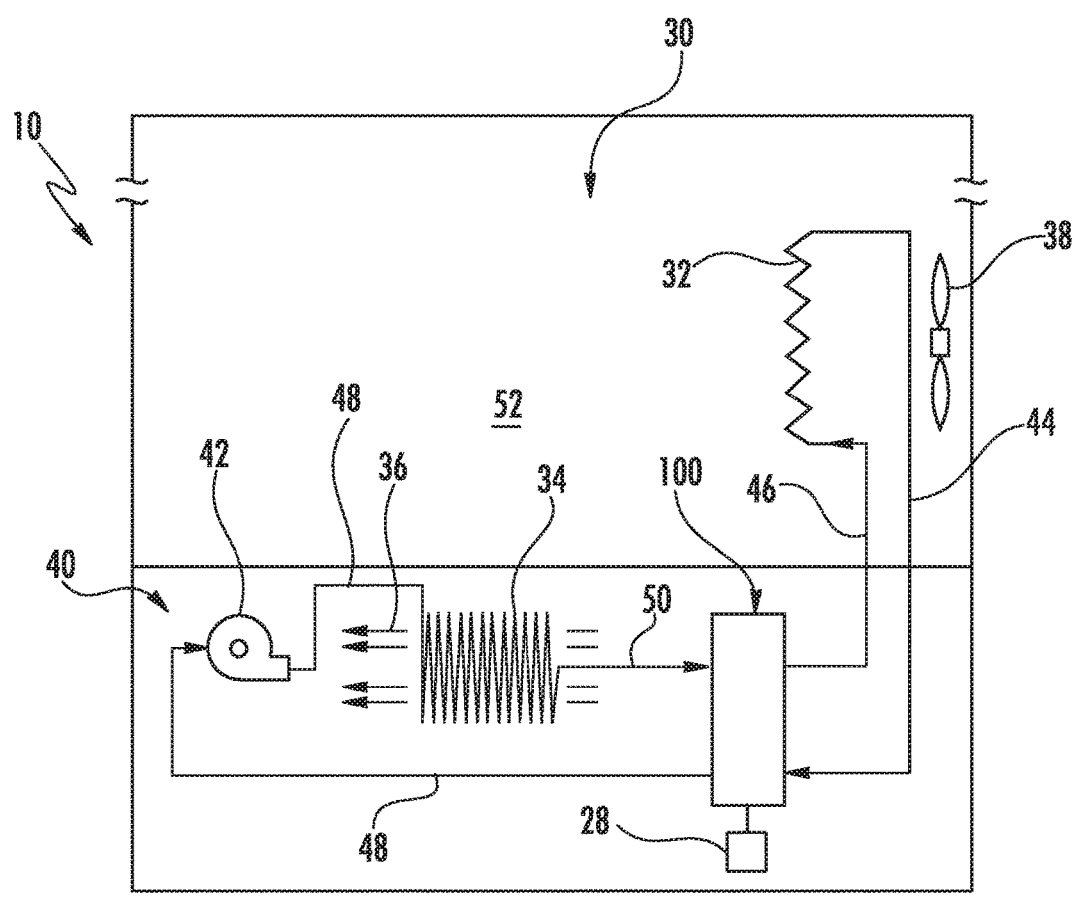
FIG. 2 is a schematic illustration of certain components of a heat pump system positioned in the exemplary refrigerator appliance of FIG. 1.

FIG. 2 is a schematic view of various components of refrigerator appliance 10, including a machinery compartment 30 and a machinery compartment 40. In particular, machinery compartment 30 includes a heat pump system 52 having a first or cold side heat exchanger 32 positioned in refrigeration compartment 30 for the removal of heat therefrom. A heat transfer fluid such as e.g., an aqueous solution, flowing within first heat exchanger 32 receives heat from refrigeration compartment 30 thereby cooling contents of refrigeration compartment 30. A fan 38 may be used to provide for a flow of air across first heat exchanger 32 to improve the rate of heat transfer from refrigeration compartment 30.

The heat transfer fluid flows out of first heat exchanger 32 by line 44 to heat pump 100. As will be further described herein, the heat transfer fluid receives additional heat from magneto-caloric material (MCM) in heat pump 100 and carries this heat by line 48 to pump 42 and then to second or hot side heat exchanger 34. Heat is released to the environment, machinery compartment 40, and/or other location external to refrigeration compartment 30 using second heat exchanger 34. A fan 36 may be used to create a flow of air across second heat exchanger 34 and thereby improve the rate of heat transfer to the environment. Pump 42 connected into line 48 causes the heat transfer fluid to recirculate in heat pump system 52. Motor 28 is in mechanical communication with heat pump 100, as will be further described.

From second heat exchanger 34, the heat transfer fluid returns by line 50 to heat pump 100 where, as will be further described below, the heat transfer fluid loses heat to the MCM in heat pump 100. The now colder heat transfer fluid flows by line 46 to first heat exchanger 32 to receive heat from refrigeration compartment 30 and repeat the cycle as just described.

Heat pump system 52 is provided by way of example only. Other configurations of heat pump system 52 may be used as well. For example, lines 44, 46, 48, and 50 provide fluid communication between the various components of heat pump system 52 but other heat transfer fluid recirculation loops with different lines and connections may also be employed. For example, pump 42 can also be positioned at other locations or on other lines in system 52. Still other configurations of heat pump system 52 may be used as well.

FIGS. 3 through 11 illustrate an exemplary heat pump 100 and components thereof, and the use of such heat pumps 100 with heat pump system 52, in accordance with exemplary embodiments of the present disclosure. Components of heat pump 100 may be oriented relative to a coordinate system for heat pump 100, which may include a vertical direction V, a transverse direction T and a lateral direction L, all of which may be mutually perpendicular and orthogonal to one another.

Figure 5:
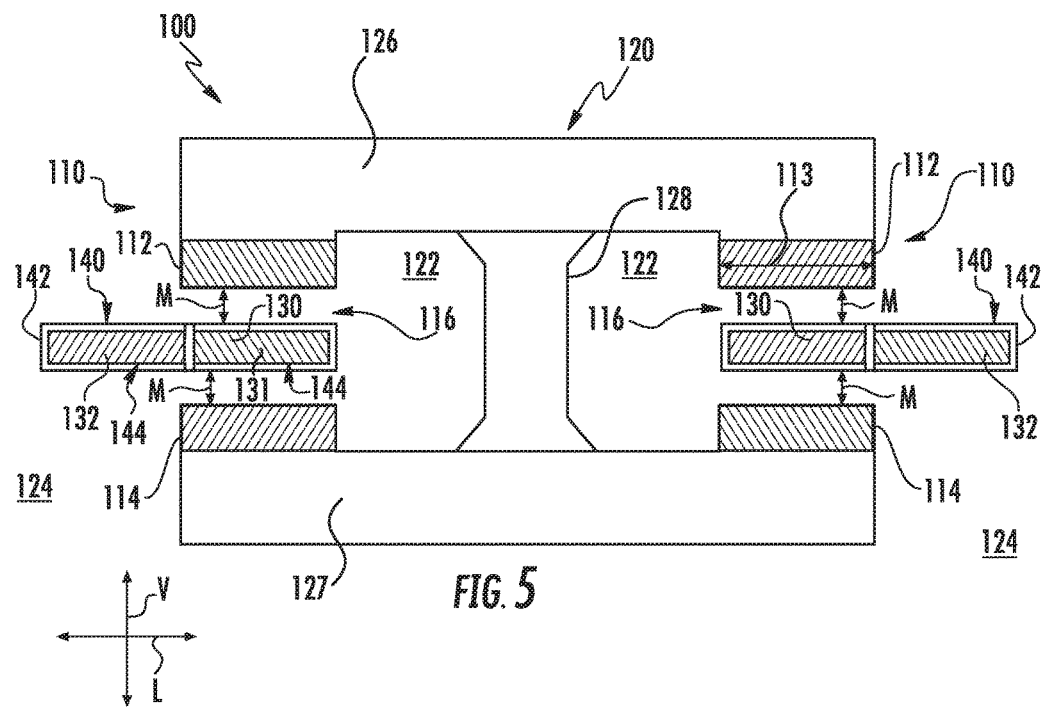
FIG. 5 is a front view of an exemplary caloric heat pump of the heat pump system of FIG. 2, with first stages of MCM within magnetic fields and second stages of MCM out of magnetic fields.
Figure 6:
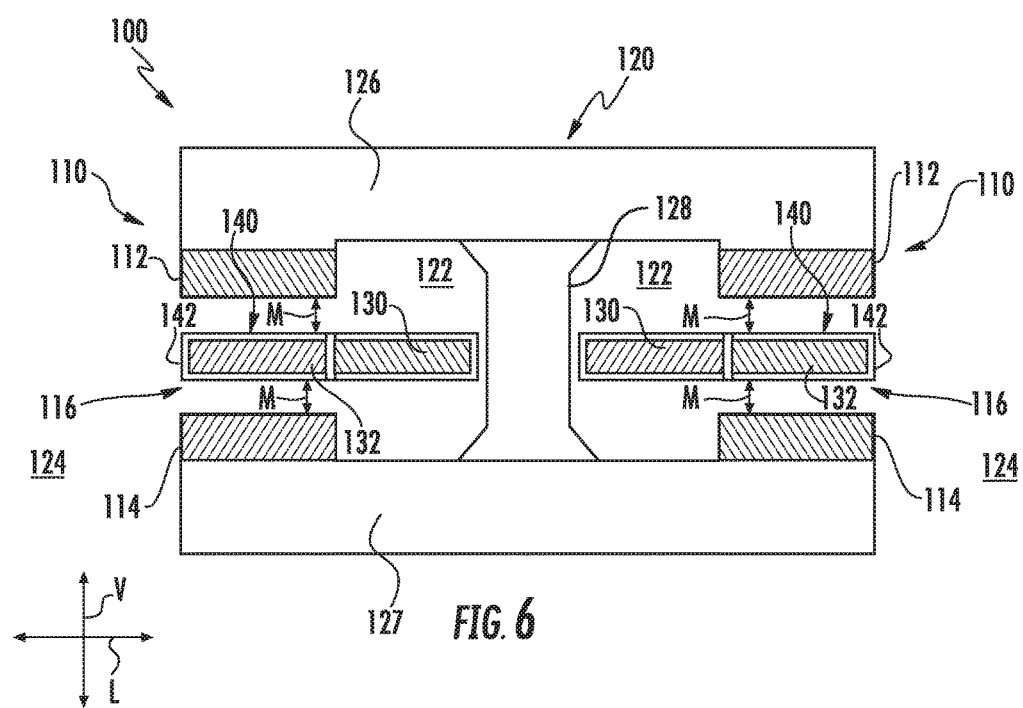
FIG. 6 is a front view of the exemplary caloric heat pump of the heat pump system of FIG. 2, with first stages of MCM out of magnetic fields and second stages of MCM within magnetic fields.

As shown in FIGS. 5 and 6, heat pump 100 includes one or more magnet assemblies 110, each of which creates a magnetic field M. For example, a magnetic field M may be generated by a single magnet, or by multiple magnets. In exemplary embodiments as illustrated, a first magnet 112 and a second magnet 114 may be provided, and the magnetic field M may be generated between magnets 112, 114. Magnets 112, 114 may, for example, have opposite magnetic polarities such that they either attract or repel each other. Magnets 112, 114 of magnet assembly 110 may also be spaced apart from each other, such as along the vertical direction V. A gap 116 may thus be defined between first magnet 112 and second magnet 114, such as along the vertical direction V.

Heat pump 100 may further include a support frame 120 which supports magnet assembl(ies) 110. Magnet assembly 110 may be connected to support frame 120. For example, each magnet 112, 114 of magnet assembly 110 may be connected to support frame 120. Such connection in exemplary embodiments is a fixed connection via a suitable adhesive, mechanical fasteners and/or a suitable connecting technique, such as welding, brazing, etc. Support assembly 120 may, for example, support magnets 112, 114 in position such that gap 114 is defined between magnets 112, 114.

As illustrated, support frame 120 is an open-style frame, such that interior portions of support frame 120 are accessible from exterior to support frame 120 (e.g. in the lateral and transverse directions L, T) and components of heat pump 100 can be moved from interior to support frame 120 to exterior to support frame 120 and vice-versa. For example, support frame 120 may define one or more interior spaces 122. Multiple interior spaces 122, as shown, may be partitioned from each other by frame members or other components of the support frame 120. An interior space 122 may be contiguous with associated magnets 112, 114 (i.e. magnet assembly 110) and gap 116, such as along the lateral direction L. Support frame 120 may additionally define one or more exterior spaces 124, each of which includes the exterior environment proximate support frame 120. Specifically, an exterior space 124 may be contiguous with associated magnets 112, 114 (i.e. magnet assembly 110) and gap 116, such as along the lateral direction L. An associated interior space 122 and exterior space 124 may be disposed on opposing sides of associated magnets 112, 114 (i.e. magnet assembly 110) and gap 116, such as along the lateral direction L. Thus, magnet assembly 110 and gap 116 may be positioned between an associated interior space 122 and exterior space 124, e.g., along the lateral direction L.

As illustrated in FIGS. 5 and 6, support frame 120, frame members and other components thereof may include and form one or more C-shaped portions. A C-shaped portion may, for example, define an interior space 122 and associated gap 116, and may further define an associated exterior space 124 as shown. In exemplary embodiments as illustrated, support frame 120 may support two magnet assemblies 110, and may define an interior space 122, gap 116, and exterior space 124 associated with each of two magnet assemblies 110. Alternatively, however, a support frame 120 may support only a single magnet assembly 110 or three or more magnet assemblies 110.

Various frame members may be utilized to form support frame 120. For example, in some exemplary embodiments, an upper frame member 126 and a lower frame member 127 may be provided. Lower frame member 127 may be spaced apart from upper frame member 126 along the vertical axis V. First magnet(s) 112 may be connected to upper frame member 126, and second magnet(s) 114 may be connected to lower frame member 127. In exemplary embodiments, upper frame member 126 and lower frame member 127 may be formed from materials which have relatively high magnetic permeability, such as iron.

In some exemplary embodiments, as illustrated in FIGS. 5 and 6, a support frame 120 may further include an intermediate frame member 128. Intermediate frame member 128 may be disposed and extend between and connect upper frame member 126 and lower frame member 127, and may in some exemplary embodiments be integrally formed with upper and lower frame members 126, 127. As shown, multiple interior spaces 122 may be partitioned from each other by intermediate frame member 128. In some exemplary embodiments, intermediate frame member 128 may be formed from materials which have relatively high magnetic permeability, such as iron. In other exemplary embodiments, intermediate frame member 128 may be formed from materials which have relatively lower magnetic permeability than those of upper and lower frame members 126, 127. Accordingly, such materials, termed magnetically shielding materials herein, may facilitate direction of magnetic flux paths only through upper and lower frame members 126, 127 and magnet assemblies 110, advantageously reducing losses in magnetic strength, etc.

Referring again to FIGS. 3 through 11, heat pump 100 may further include a plurality of stages, each of which includes a magneto-caloric material (MCM). In exemplary embodiments, such MCM stages may be provided in pairs, each of which may for example include a first stage 130 and a second stage 132. Each stage 130, 132 may include one or more different types of MCM. Further, the MCM(s) provided in each stage 130, 132 may be the same or may be different.

As provided in heat pump 100, each stage 130, 132 may extend, such as along the transverse direction T, between a first end portion 134 and a second end portion 136. As discussed herein, working fluid (also referred to herein as heat transfer fluid or fluid refrigerant) may flow into each stage 130, 132 and from each stage 130, 132 through first end portion 134 and second end portion 136. Accordingly, working fluid flowing through a stage 130, 132 during operation of heat pump 100 flows generally along the transverse direction T between first and second end portions 134, 136 of stages 130, 132.

Stages 130, 132, such as each pair of stages 130, 132, may be disposed within regenerator housings 140. Regenerator housing 140 along with stages 130, 132 and optional insulative materials may collectively be referred to as a regenerator assembly. As shown in FIGS. 5 and 6, regenerator housing 140 includes a body 142 which defines a plurality of chambers 144, each of which extends along the transverse direction T between opposing ends of chamber 144. Chambers 144 of a regenerator housing 140 may thus be arranged in a linear array along the lateral direction L, as shown. Each stage 130, 132, such as of a pair of stages 130, 132, may be disposed within one of chambers 144 of a regenerator housing 140. Accordingly, these stages 130, 132 may be disposed in a linear array along the lateral direction L. As illustrated, in exemplary embodiments, each regenerator housing 140 may include a pair of stages 130, 132. Alternatively, three, four or more stages 130, 132 may be provided in a regenerator housing 140.

The regenerator housing(s) 140 (and associated stages 130, 132) and magnet assembly(s) 110 may be movable relative to each other, such as along the lateral direction L. In exemplary embodiments as shown, for example, each regenerator housing 140 (and associated stages 130, 132) is movable relative to an associated magnet assembly 110, such as along the lateral direction L. Alternatively, however, each magnet assembly 110 may be movable relative to the associated regenerator housing 140 (and associated stages 130, 132), such as along the lateral direction L.

Such relative movement between regenerator housing 140 and an associated magnet assembly 110 causes movement of each stage 130, 132 into the magnetic field M and out of the magnetic field M. As discussed herein, movement of a stage 130, 132 into the magnetic field M may cause the magnetic moments of the material to orient and the MCM to heat (or alternatively cool) as part of the magneto-caloric effect. When one of stages 130, 132 is out of the magnetic field M, the MCM may thus cool (or alternatively heat) due to disorder of the magnetic moments of the material.

For example, a regenerator housing 140 (or an associated magnet assembly 110) may be movable along the lateral direction L between a first position and a second position. In the first position (as illustrated for example in FIGS. 3 and 5), regenerator housing 140 may be positioned such that first stage 130 disposed within regenerator housing 140 is within the magnetic field M and second stage 132 disposed within regenerator housing 140 is out of the magnetic field M. Notably, being out of the magnetic field M means that second stage 132 is generally or substantially uninfluenced by the magnets and resulting magnetic field M. Accordingly, the MCM of the stage as a whole may not be actively heating (or cooling) as it would if within the magnetic field M (and instead may be actively or passively cooling (or heating) due to such removal of the magnetic field M). In the second position (as illustrated for example in FIGS. 4 and 6), regenerator housing 140 may be positioned such that first stage 130 disposed within regenerator housing 140 is out of the magnetic field M and second stage 132 disposed within regenerator housing 140 is within the magnetic field M.

Regenerator housing 140 (or an associated magnet assembly 110) is movable along the lateral direction L between the first position and the second position. Such movement along the lateral direction L from the first position to the second position may be referred to herein as a first transition, while movement along the lateral direction L from the second position to the first position may be referred to herein as a second transition.

Figure 8:
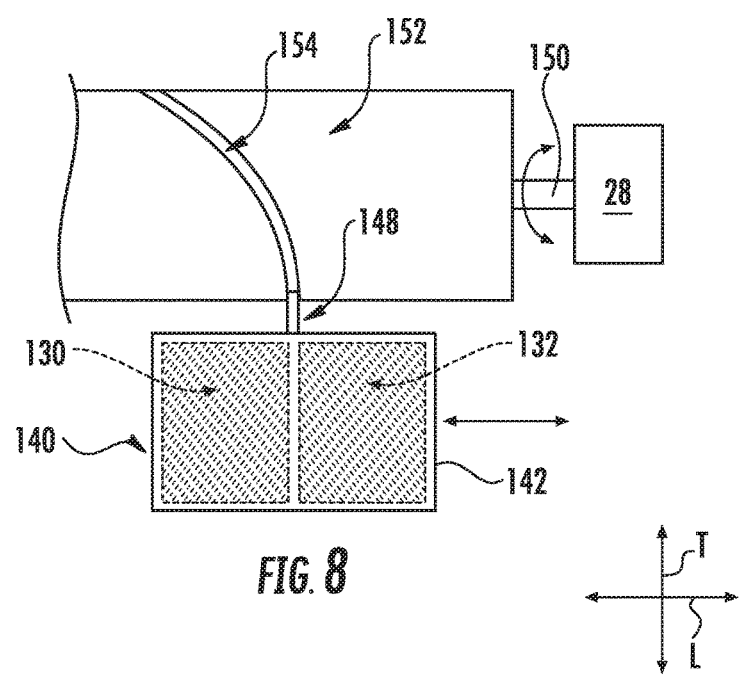
FIG. 8 is a top view of certain components of the exemplary caloric heat pump of FIG. 5.
Figure 9:
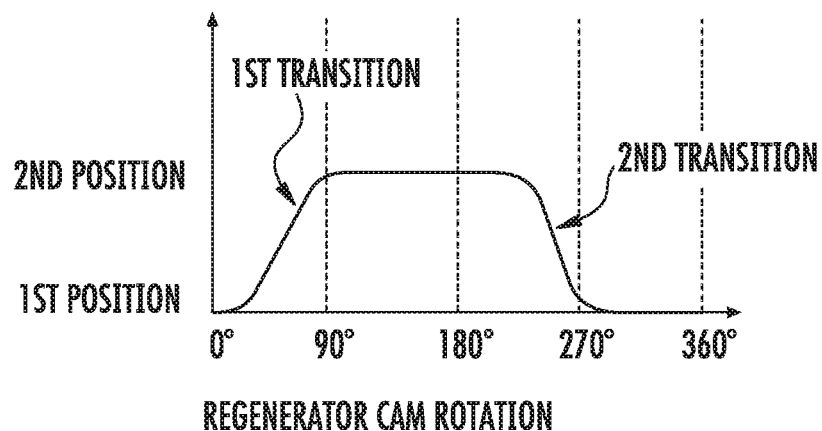
FIG. 9 is a chart illustrating movement of a regenerator housing and associated MCM stages in accordance with an exemplary embodiment of the present disclosure.

Referring to FIGS. 8 and 9, movement of a regenerator housing 140 (or an associated magnet assembly 110) may be caused by operation of motor 26. Motor 26 may be in mechanical communication with regenerator housing 140 (or magnet assembly 110) and configured for moving regenerator housing 140 (or magnet assembly 110) along the lateral direction L (i.e. between the first position and second position). For example, a shaft 150 of motor 28 may be connected to a cam. The cam may be connected to the regenerator housing 140 (or associated magnet assembly 110), such that relative movement of the regenerator housing 140 and associated magnet assembly 110 is caused by and due to rotation of the cam. The cam may, as shown, be rotational about the lateral direction L.

For example, in some exemplary embodiments as illustrated in FIGS. 8 and 9, the cam may be a cam cylinder 152. Cam cylinder 152 may be rotational about an axis that is parallel to the lateral direction L. A cam groove 154 may be defined in cam cylinder 152, and a follower tab 148 of regenerator housing 120 may extend into cam groove 154. Rotation of motor 28 may cause rotation of cam cylinder 152. Cam groove 154 may be defined in a particularly desired cam profile such that, when cam cylinder 152 rotates, tab 148 moves along the lateral direction L between the first position and second position due to the pattern of cam groove 154 and in the cam profile, in turn causing such movement of regenerator housing 120.

FIG. 9 illustrates one exemplary embodiment of a cam profile which includes a first position, first transition, second position, and second transition. Notably, in exemplary embodiments the period during which a regenerator housing 140 (or an associated magnet assembly 110) is dwelling in the first position and/or second position may be longer than the period during which the regenerator housing 140 (or an associated magnet assembly 110) is moving in the first transition and/or second transition. Accordingly, the cam profile defined by the cam defines the first position, the second position, the first transition, and the second transition. In exemplary embodiments, the cam profile causes the one of regenerator housing 140 or magnet assembly 110 to dwell in the first position and the second position for periods of time longer than time periods in the first transition and second transition.

Figure 3:
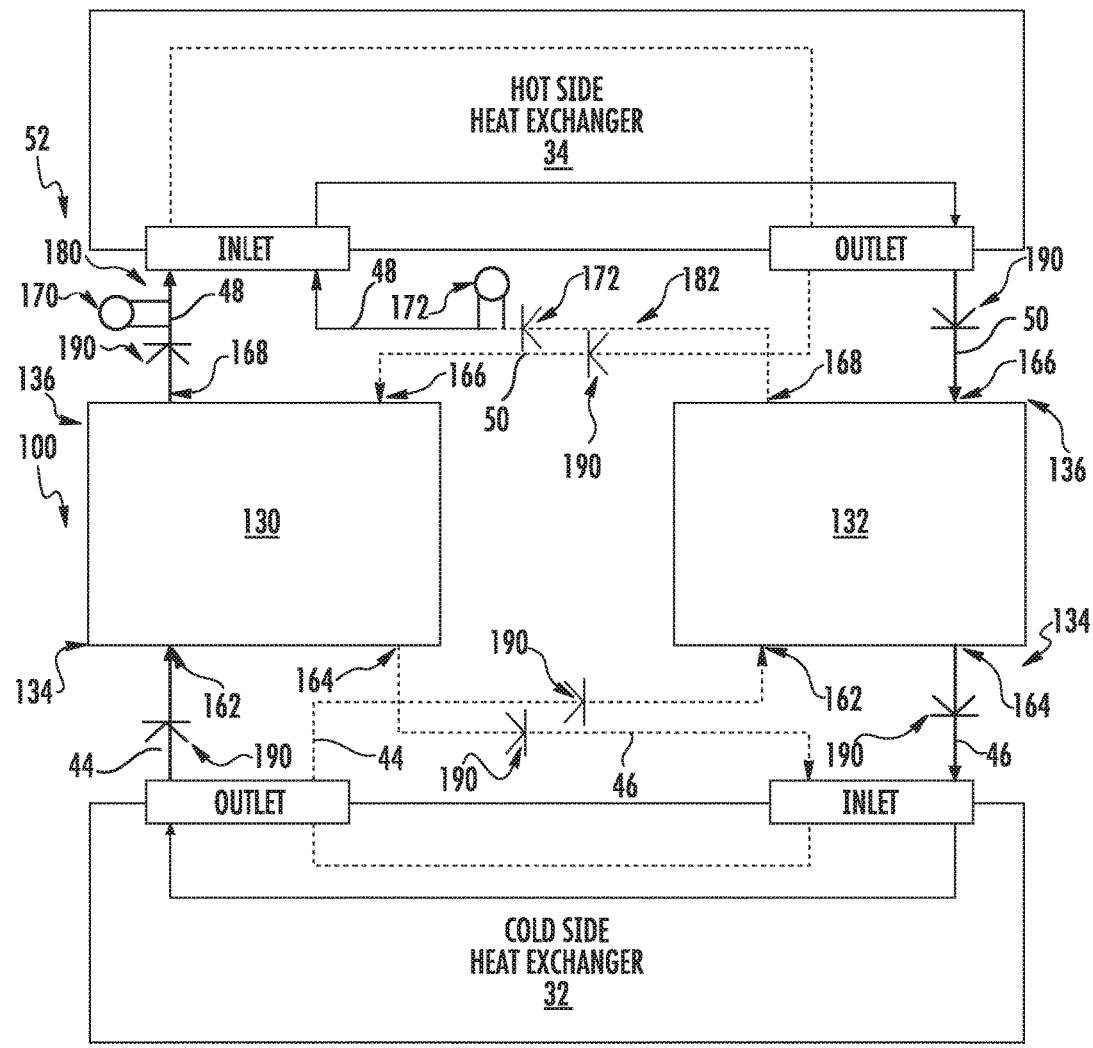
FIG. 3 is a schematic illustration of certain components of the heat pump system of FIG. 2, with a first stage of MCM within a magnetic field and a second stage of MCM out of a magnetic field, in accordance with an exemplary embodiment of the present disclosure.
Figure 4:
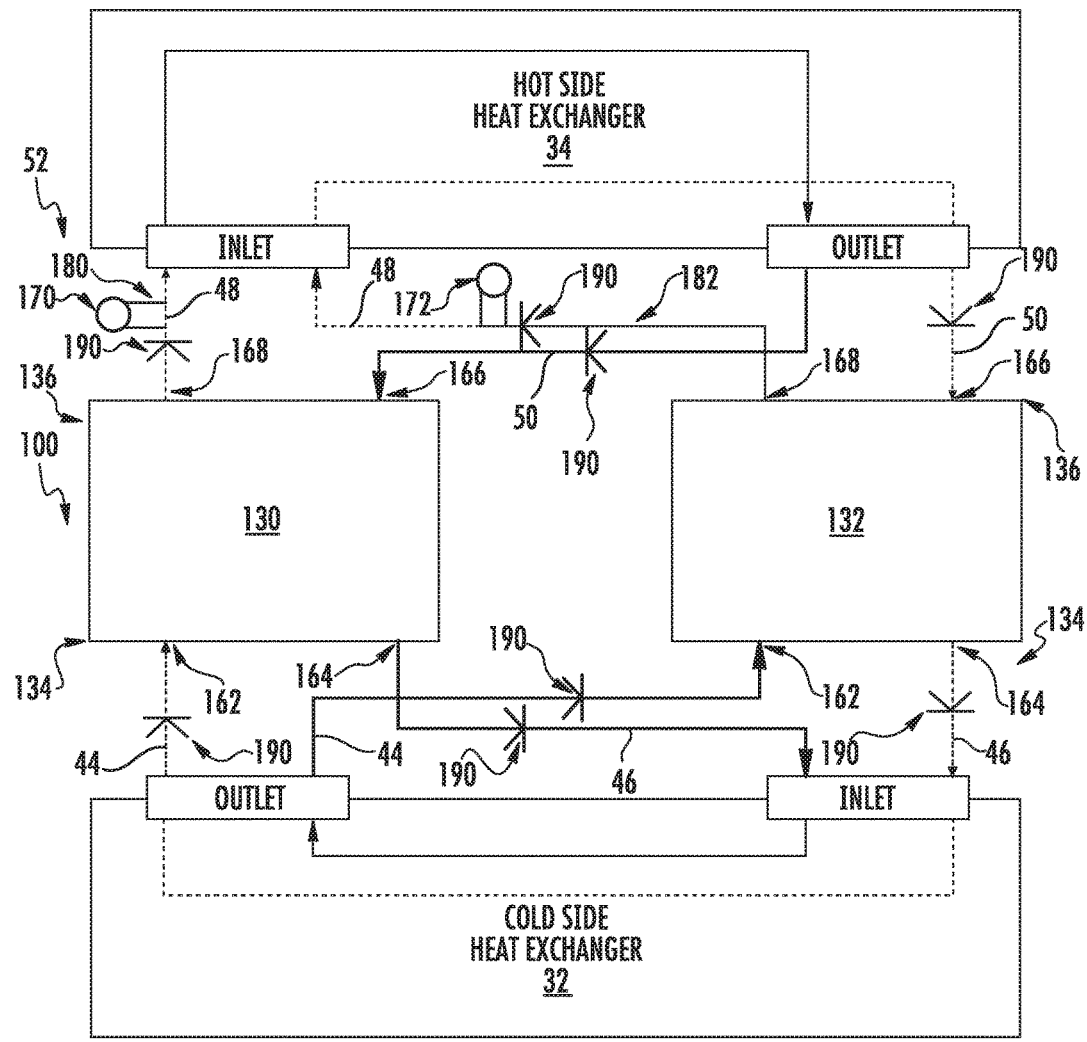
FIG. 4 is a schematic illustration of certain components of the exemplary heat pump system of FIG. 2, with the first stage of MCM out of the magnetic field and the second stage of MCM within the magnetic field.
Figure 7:
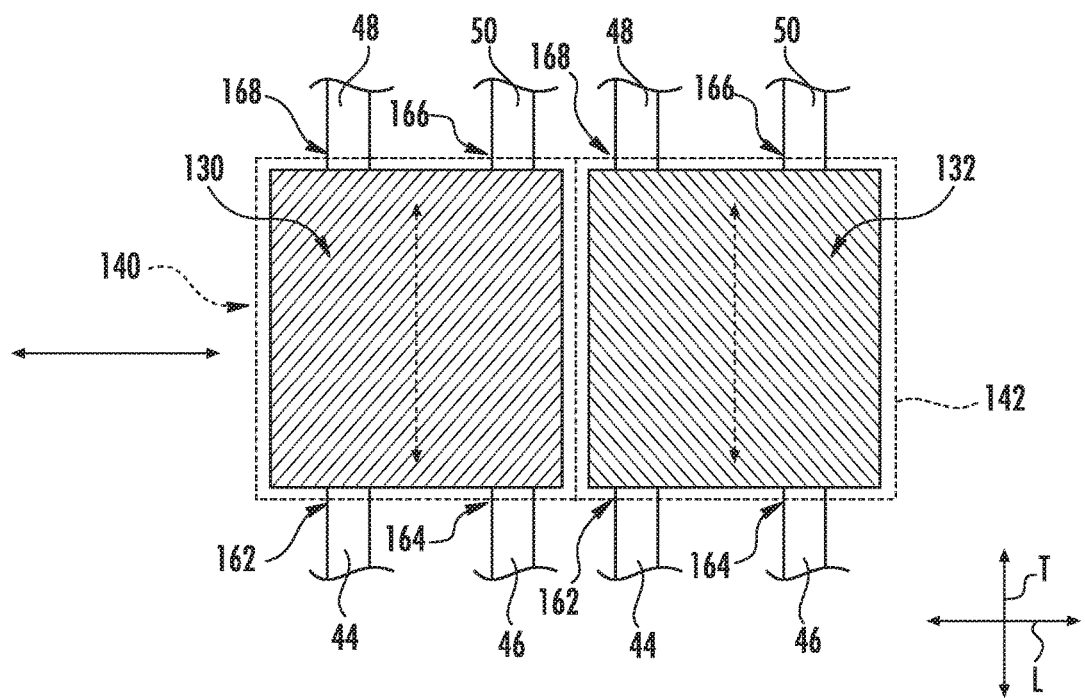
FIG. 7 is a top view of a regenerator housing and MCM stages of the exemplary caloric heat pump of FIG. 5.

Referring again to FIG. 2, in some exemplary embodiments, lines 44, 46, 48, 50 may facilitate the flow of working fluid between heat exchangers 32, 34 and heat pump 100. Referring now to FIGS. 3, 4 and 7, in exemplary embodiments, lines 44, 46, 48, 50 may facilitate the flow of working fluid between heat exchangers 32, 34 and stages 130, 132 of heat pump 100. Working fluid may flow to and from each stage 130, 132 through various apertures defined in each stage. The apertures generally define the locations of working fluid flow to or from each stage. In some exemplary embodiments as illustrated in FIGS. 3, 4 and 7, multiple apertures (e.g., two apertures) may be defined in first end 134 and second end 136 of each stage 130, 132. For example, each stage 130, 132 may define a cold side inlet 162, a cold side outlet 164, a hot side inlet 166 and a hot side outlet 168. Cold side inlet 162 and cold side outlet 164 may be defined in each stage 130, 132 at first end 134 of stage 130, 132, and hot side inlet 166 and hot side outlet 168 may be defined in each stage 130, 132 at second end 136 of stage 130, 132. The inlets and outlets may provide fluid communication for the working fluid to flow into and out of each stage 130, 132, and from or to heat exchangers 32, 34. For example, a line 44 may extend between cold side heat exchanger 32 and cold side inlet 162, such that working fluid from heat exchanger 32 flows through line 44 to cold side inlet 162. A line 46 may extend between cold side outlet 164 and cold side heat exchanger 32, such that working fluid from cold side outlet 164 flows through line 46 to heat exchanger 32. A line 50 may extend between hot side heat exchanger 34 and hot side inlet 166, such that working fluid from heat exchanger 34 flows through line 50 to hot side inlet 166. A line 48 may extend between hot side outlet 168 and hot side heat exchanger 34, such that working fluid from hot side outlet 168 flows through line 48 to heat exchanger 34.

When a regenerator housing 140 (and associated stages 130, 132) is in a first position, a first stage 130 may be within the magnetic field and a second stage 132 may be out of the magnetic field. Accordingly, working fluid in first stage 130 may be heated (or cooled) due to the magneto-caloric effect, while working fluid in second stage 132 may be cooled (or heated) due to the lack of magneto-caloric effect. Additionally, when a stage 130, 132 is in the first position or second position, working fluid may be actively flowed to heat exchangers 32, 34, such as through inlets and outlets of the various stages 130, 132. Working fluid may be generally constant or static within stages 130, 132 during the first and second transitions.

Figure 10:
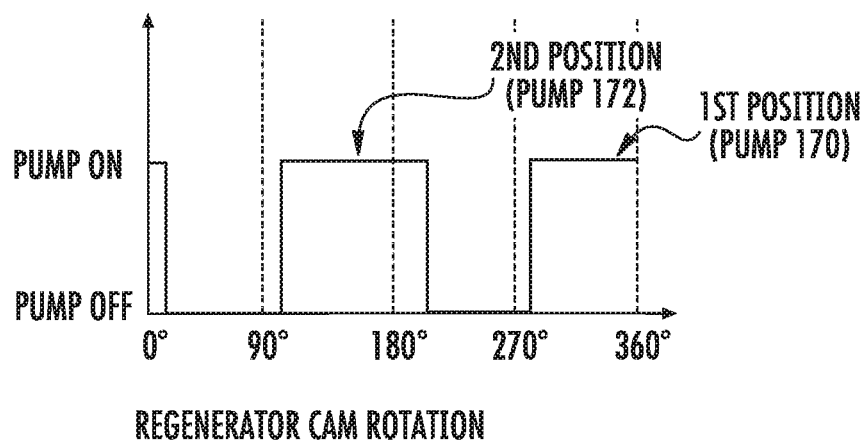
FIG. 10 is a chart illustrating operation of pumps to actively flow working fluid in accordance with an exemplary embodiment of the present disclosure.

One or more pumps 170, 172 (each of which may be a pump 42 as discussed herein) may be operable to facilitate such active flow of working fluid when the stages are in the first position or second position. In exemplary embodiments, each pump is or includes a reciprocating piston. For example, a single pump assembly may include two reciprocating pistons. For example, a first pump 170 (which may be or include a piston) may operate to flow working fluid when the stages 130, 132 are in the first position (such that stage 130 is within the magnetic field M and stage 132 is out of the magnetic field M), while a second pump 172 (which may be or include a piston) may operate to flow working fluid when the stages 130, 132 are in the second position (such that stage 132 is within the magnetic field M and stage 130 is out of the magnetic field M). Operation of a pump 170, 172 may cause active flow of working fluid through the stages 130, 132, heat exchangers 32, 34, and system 52 generally. Each pump 170, 172 may be in fluid communication with the stages 130, 132 and heat exchangers 32, 34, such as on various lines between stages 130, 132 and heat exchangers 32, 34. In exemplary embodiments as shown, the pumps 170, 172 may be on "hot side" lines between the stages 130, 132 and heat exchanger 34 (i.e. on lines 48). Alternatively, the pumps 170, 172 may be on "cold side" lines between the stages 130, 132 and heat exchanger 32 (i.e. on lines 44). Referring briefly to FIG. 10, operation of the pumps 170, 172 relative to movement of a regenerator housing 140 and associated stages 130, 132 through a cam profile is illustrated. First pump 170 may operate when the stages are in the first position, and second pump 172 may operate when the stages are in the second position.

Working fluid may be flowable from a stage 130, 132 through hot side outlet 168 and to stage 130, 132 through cold side inlet 162 when the stage is within the magnetic field M. Working fluid may be flowable from a stage 130, 132 through cold side outlet 164 and to the stage through hot side inlet 166 during movement of stage 130, 132 when the stage is out of the magnetic field M. Accordingly, and referring now to FIGS. 3 and 4, a first flow path 180 and a second flow path 182 may be defined. Each flow path 180 may include flow through a first stage 130 and second stage 132, as well as flow through cold side heat exchanger 32 and hot side heat exchanger 34. The flow of working fluid may occur either along the first flow path 180 or the second flow path 182, depending on the positioning of the first and second stages 130, 132.

FIG. 3 illustrates a first flow path 180, which may be utilized in the first position. In the first position, first stage 130 is within the magnetic field M, and second stage 132 is out of the magnetic field M. Activation and operation of pump 170 may facilitate active working fluid flow through first flow path 180. As shown, working fluid may flow from cold side heat exchanger 32 through line 44 and cold side inlet 162 of first stage 130 to the first stage 130, from first stage 130 through hot side outlet 168 and line 48 of first stage 130 to hot side heat exchanger 34, from hot side heat exchanger 34 through line 50 and hot side inlet 166 of second stage 132 to second stage 132, and from second stage 132 through cold side outlet 164 and line 46 of second stage 132 to cold side heat exchanger 32.

FIG. 4 illustrates a second flow path 182, which may be utilized during the second position. In the second position, second stage 132 is within the magnetic field M, and first stage 130 is out of the magnetic field M. Activation and operation of pump 172 may facilitate active working fluid flow through second flow path 182. As shown, working fluid may flow from cold side heat exchanger 32 through line 44 and cold side inlet 162 of second stage 132 to second stage 132, from second stage 132 through hot side outlet 168 and line 48 of second stage 132 to hot side heat exchanger 34, from hot side heat exchanger 34 through line 50 and hot side inlet 166 of first stage 130 to first stage 130, and from first stage 130 through cold side outlet 164 and line 46 of first stage 130 to cold side heat exchanger 32.

As shown in FIGS. 3 and 4 and will be understood, each of first heat exchanger 32 and second heat exchanger 34 may include at least two independent flow paths for the heat transfer fluid. For example, first and second heat exchangers 32, 34 may each include two separate (e.g., parallel) conduits for the heat transfer fluid. In such a manner, the flow path of the heat transfer fluid through first and second heat exchangers 32, 34 may depend upon operation of pumps 170, 172. For example, pumps 170, 172 may be synchronized such that one of pumps 170, 172 is pumping in heat transfer fluid while the other of pumps 170, 172 is pumping out heat transfer fluid, as discussed in greater detail below. In such a manner, a volume of heat transfer fluid may be maintained within system 52.

Notably, check valves 190 may in some exemplary embodiments be provided on the various lines 44, 46, 48, 50 to prevent backflow there-through. Check valves 190, in combination with differential pressures during operation of heat pump 100, may thus generally prevent flow through the improper flow path when working fluid is being actively flowed through one of flow paths 190, 192.

For example, flexible lines 44, 46, 48, 50 may each be formed from one of a polyurethane, a rubber, or a polyvinyl chloride, or another suitable polymer or other material. In exemplary embodiments, lines 44, 46, 48, 50 may further be fiber impregnated, and thus include embedded fibers, or may be otherwise reinforced. For example, glass, carbon, polymer or other fibers may be utilized, or other polymers such as polyester may be utilized to reinforce lines 44, 46, 48, 50.

Figure 11:
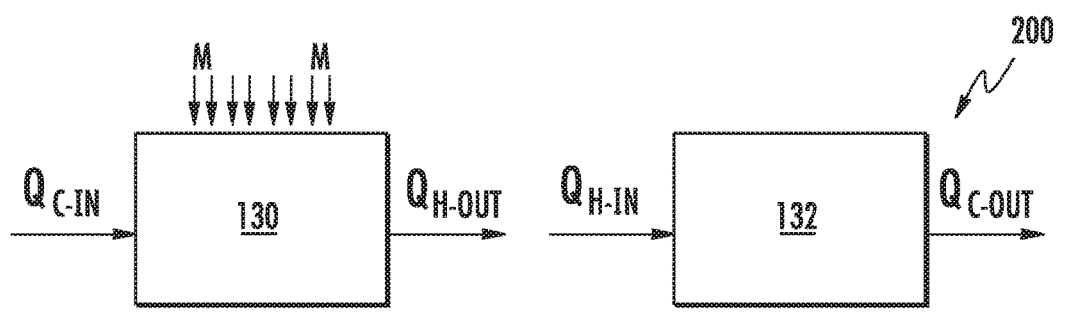
FIG. 11 is a schematic diagram illustrating various positions and movements there-between of MCM stages in accordance with an exemplary embodiment of the present disclosure.
Figure 11:
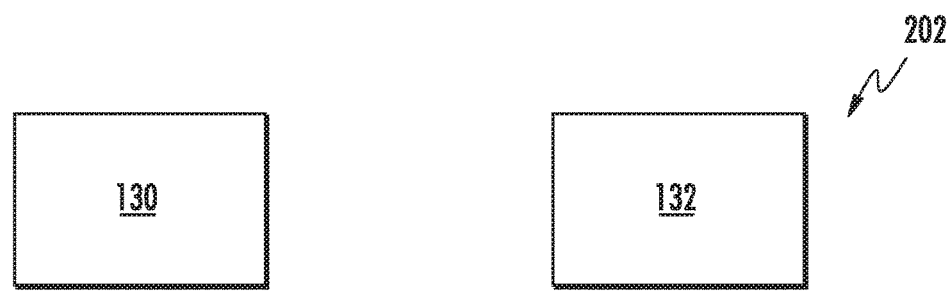
Figure 11:
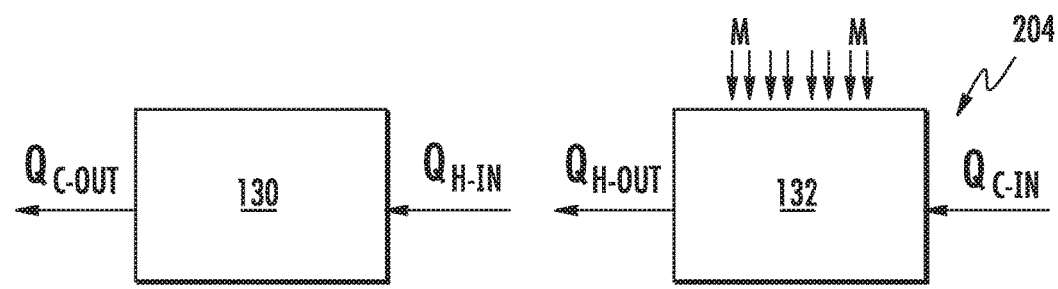
Figure 11:
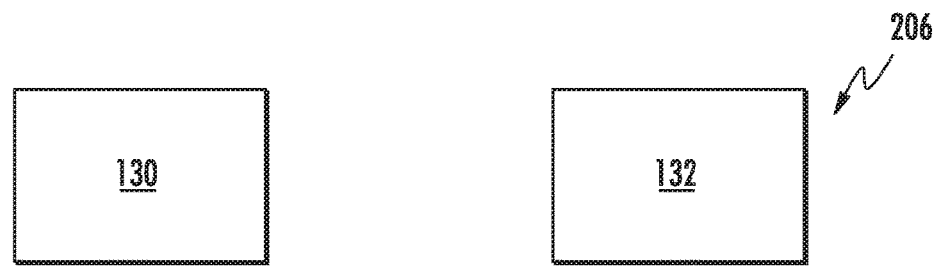

FIG. 11 illustrates an exemplary method of the present disclosure using a schematic representation of associated stages 130, 132 of MCM during dwelling in and movement between the various positions as discussed herein. With regard to first stage 130, during step 200, which corresponds to the first position, stage 130 is fully within magnetic field M, which causes the magnetic moments of the material to orient and the MCM to heat as part of the magneto caloric effect. Further, pump 170 is activated to actively flow working fluid in first flow path 180. As indicated by arrow $Q_{H-OUT}$, working fluid in stage 130, now heated by the MCM, can travel out of stage 130 and along line 48 to second heat exchanger 34. At the same time, and as indicated by arrow $Q_{H-IN}$, working fluid from first heat exchanger 32 flows into stage 130 from line 44. Because working fluid from first heat exchanger 32 is relatively cooler than the MCM in stage 130, the MCM will lose heat to the working fluid.

In step 202, stage 130 is moved from the first position to the second position in the first transition. During the time in the first transition, working fluid dwells in the MCM of stage 130. More specifically, the working fluid does not actively flow through stage 130.

In step 204, stage 130 is in the second position and thus out of magnetic field M. The absence or lessening of the magnetic field is such that the magnetic moments of the material become disordered and the MCM absorbs heat as part of the magnetocaloric effect. Further, pump 172 is activated to actively flow working fluid in the second flow path 182. As indicated by arrow $Q_{C-OUT}$, working fluid in stage 130, now cooled by the MCM, can travel out of stage 130 and along line 46 to first heat exchanger 32. At the same time, and as indicated by arrow $Q_{C-IN}$, working fluid from second heat exchanger 34 flows into stage 112 from line 50 when stage 130 is in the second transition. Because working fluid from second heat exchanger 34 is relatively warmer than the MCM in stage 130, the MCM will lose some of its heat to the working fluid. The working fluid now travels along line 46 to first heat exchanger 32 to receive heat and cool refrigeration compartment 30.

In step 206, stage 130 is moved from the second position to the first position in the second transition. During the time in the second transition, the working fluid dwells in the MCM of stage 130. More specifically, the working fluid does not actively flow through stage 130.

With regard to second stage 132, during step 200, which corresponds to the first position, second stage 132 is out of magnetic field M. The absence or lessening of the magnetic field is such that the magnetic moments of the material become disordered and the MCM absorbs heat as part of the magneto-caloric effect. Further, pump 170 is activated to actively flow working fluid in first flow path 180. As indicated by arrow $Q_{C-OUT}$, working fluid in stage 132, now cooled by the MCM, can travel out of stage 132 and along line 46 to first heat exchanger 32. At the same time, and as indicated by arrow $Q_{C-IN}$, working fluid from second heat exchanger 34 flows into stage 112 from line 50 when stage 132 is in the second transition. Because working fluid from second heat exchanger 34 is relatively warmer than the MCM in stage 132, the MCM will lose some of its heat to the working fluid. The working fluid now travels along line 46 to first heat exchanger 32 to receive heat and cool the refrigeration compartment 30.

In step 202, stage 132 is moved from the first position to the second position in the first transition. During the time in the first transition, the working fluid dwells in the MCM of stage 132. More specifically, the working fluid does not actively flow through stage 132.

In step 204, stage 132 is in the second position and thus fully within magnetic field M, which causes the magnetic moments of the material to orient and the MCM to heat as part of the magneto caloric effect. Further, pump 172 is activated to actively flow working fluid in the second flow path 182. As indicated by arrow $Q_{H-OUT}$, working fluid in stage 132, now heated by the MCM, can travel out of stage 132 and along line 48 to second heat exchanger 34. At the same time, and as indicated by arrow $Q_{H-IN}$, working fluid from first heat exchanger 32 flows into stage 132 from line 44. Because working fluid from first heat exchanger 32 is relatively cooler than the MCM in stage 132, the MCM will lose heat to the working fluid.

In step 206, stage 132 is moved from the second position to the first position in the second transition. During the time in the second transition, working fluid dwells in the MCM of stage 132. More specifically, the working fluid does not actively flow through stage 132.

Figure 12:
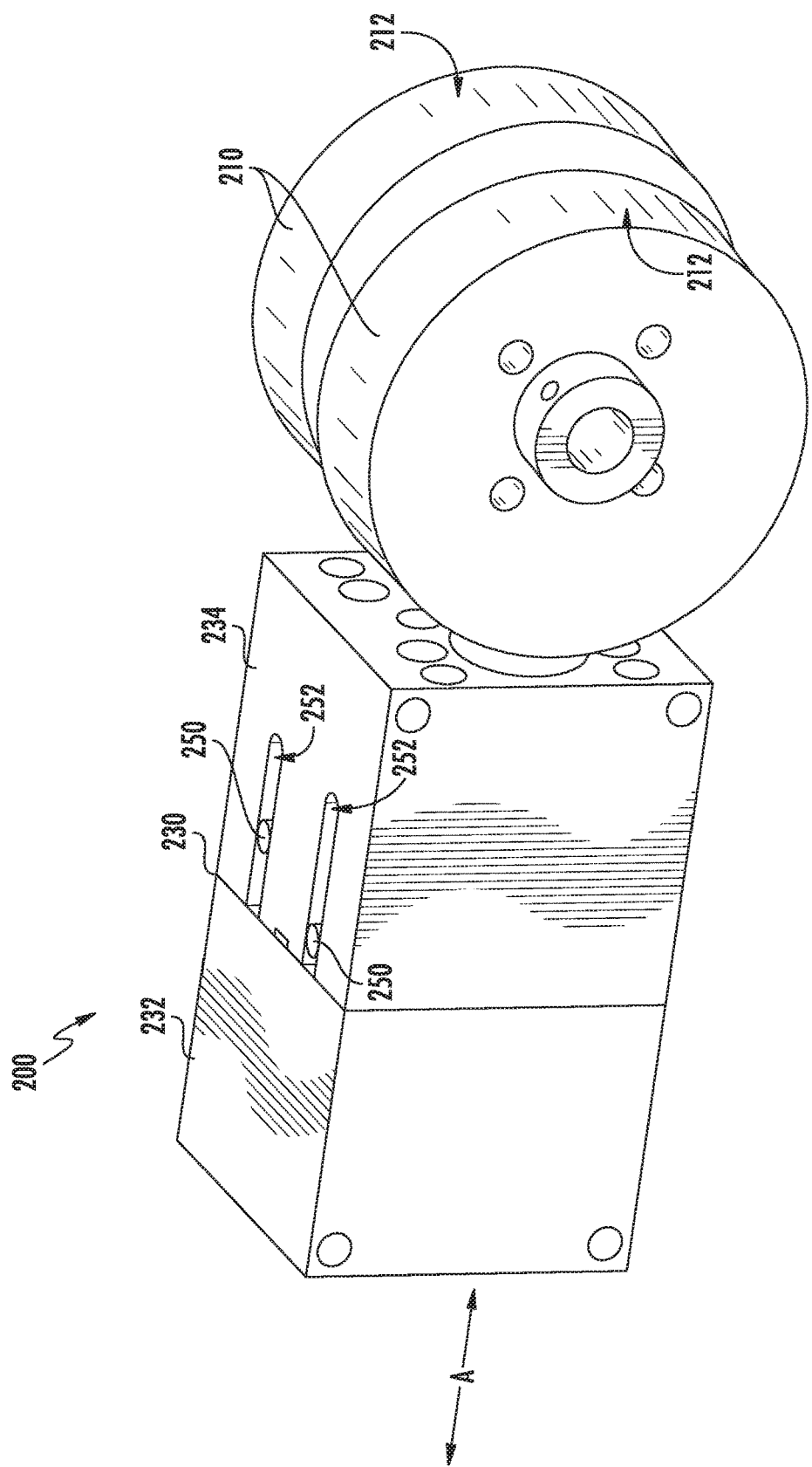
FIG. 12 provides a perspective view of a pump according to an exemplary embodiment of the present subject matter.
Figure 13:
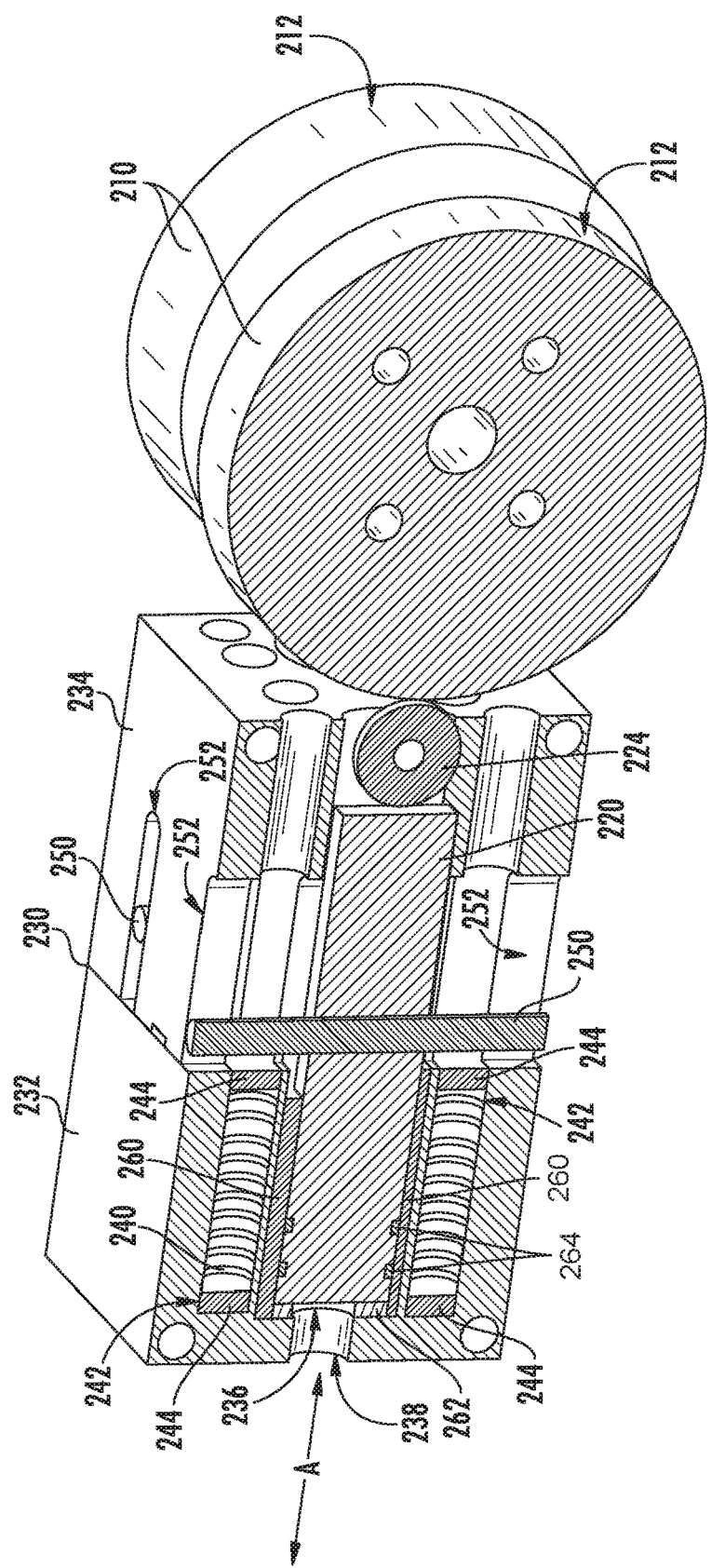
FIG. 13 provides a section view of the exemplary pump of FIG. 12.

FIG. 12 provides a perspective view of a pump 200 according to an exemplary embodiment of the present subject matter. FIG. 13 provides a section view of pump 200. Pump 200 is discussed in greater detail below in the context of heat pump 100. Thus, pump 200 is operable to circulate the working fluid through stages 130, 132 during operation of heat pump 100. However, it will be understood that pump 200 may be used in or with any suitable caloric heat pump to circulate working fluid, in alternative exemplary embodiments. As discussed in greater detail below, pump 200 may provide a compact hydraulic displacement system that is easy to assemble.

As may be seen in FIGS. 12 and 13, pump 200 includes at least two cams 210, e.g., two, three four or more cams. In alternative exemplary embodiments, pump 200 may include only one cam 210. Cams 210 are coupled to a motor, such as motor 28 such that cam 210 is rotatable with motor 28. In particular, cams 210 may be mounted to shaft 150 of motor 28, such that cams 210 rotate with shaft 150 during operation of motor 28. As discussed above, cam cylinder 152 (FIG. 8) may also be coupled to shaft 150. Thus, rotation of cam cylinder 152 may be synchronized with cams 210 on shaft 150, in order to provide the motion of stages 130, 132 shown in FIG. 9 while also providing synchronized operation of pump 200 shown in FIG. 10.

Cam 210 has a bearing surface 212. Bearing surface 212 of cam 210 may correspond to the outermost surface of cam 210 in a plane that is perpendicular to an axis of rotation for cam 210. Bearing surface 212 of cam 210 may have any suitable shape. For example, as shown in FIGS. 12 and 13, bearing surface 212 may be circular in certain exemplary embodiments. In alternative exemplary embodiments, bearing surface 212 may be non-circular, such as elliptical.

Pump 200 also includes at least two pistons 220, e.g., two, three four or more pistons. In alternative exemplary embodiments, pump 200 may include only one piston 220. In certain exemplary embodiments, a number of pistons 220 matches or directly corresponds to a number of cams 210. Pistons 220 may be distributed along the axis of rotation for cams 210. Pistons 220 may also be oriented such that each of pistons 220 reciprocates parallel to one another. Thus, e.g., each of pistons 220 may reciprocate along an axial direction A. As may be seen in FIG. 12, cams 210 may be offset from each other or distributed along a direction that is perpendicular to the axial direction A.

Each piston of pistons 220 extends between a piston head 222 and a cam follower 224, e.g., along the axial direction A. Cam followers 224 of pistons 220 are positioned on a respective one of bearing surfaces 212 of cams 210. Thus, cam followers 224 of pistons 220 ride on or contact bearing surfaces 212 of cams 210 during rotation of cams 210. In such a manner, displacement or reciprocation of pistons 220 may be regulated. In particular, pistons 220 may reciprocate when cam followers 224 of pistons 220 ride on or contact bearing surfaces 212 of cams 210 during rotation of cams 210, as discussed in greater detail below. Cam followers 224 may be rotatable wheels as shown in FIG. 13, in certain exemplary embodiments.

As discussed above, each one of cam followers 224 may be positioned on a respective one of bearing surfaces 212 of cams 210. Cams 210 may be oriented and fixed relative to each other, e.g., on shaft 150, to provided suitable flow of working fluid. For example, each cam follower of cam followers 224 of pistons 220 is positioned on a respective bearing surface 212 of cams 210 such that a first one 226 of pistons 220 is at a top dead center position when a second one 228 of pistons 220 is at a bottom dead center position, as shown in FIGS. 12 and 13. Conversely, when motor 28 rotates cams 210 one-hundred and eighty degrees from the orientation shown in FIGS. 12 and 13, each cam follower of cam followers 224 of pistons 220 is positioned on a respective bearing surface 212 of cams 210 such that first one 226 of pistons 220 is at the bottom dead center position when second one 228 of pistons 220 is at the top dead center position. By rotating cams 210, pistons 220 may be oppositely reciprocated between the top and bottom dead center positions. In particular, cam followers 224 of pistons 220 may positioned on bearing surfaces 212 of cams 210 such that pistons 220 have a phase difference of one hundred and eighty degrees during operation of pump 200. Thus, pistons 220 may reciprocate in opposite directions during operation of pump 200. Cams 210 may be positioned in any other suitable arrangement to provide different motion between pistons 220 in alternative exemplary embodiments.

Pump 200 also includes a casing 230 having a first casing portion 232 and a second casing portion 234. First and second casing portions 232, 234 are mounted to each other, e.g., to collectively form casing 230. Casing 230 may be constructed of any suitable material, e.g., metal or plastic, that may be machined or otherwise constructed in the manner described below. First casing portion 232 may define at least one chamber 236. Each piston head 222 of pistons 220 is disposed within first casing portion 232 at a respective chamber 236 of first casing portion 232. Pistons 220 may extend through second casing portion 234 between piston heads 222 and cam followers 224, e.g., along the axial direction A.

At least one spring 240 is disposed within casing 230 and is coupled to piston 220. Spring 240 urges cam follower 224 of piston 220 towards bearing surface 212 of cam 210. By compressing cam follower 224 of piston 220 against bearing surface 212 of cam 210, spring 240 facilitates reciprocation of piston 220 between the top and bottom dead center positions. As shown in FIG. 13, spring 240 may include a pair of springs 240, and first casing portion 232 defines a pair of compartments 242. Compartments 242 may be positioned opposite each other about piston 220 and/or chamber 236. Springs 240 may each be disposed within a respective compartment of compartments 242.

Pump 200 may also include at least one shaft 250. Shaft 250 extends radially (e.g., perpendicular to the axial direction A) from piston 220. Second casing portion 234 of casing 230 may define at least one slot 252 that extends along the axial direction A. Shaft 250 is received within slot 252 and travels within slot 252 during reciprocation of piston 220. As shown in FIG. 13, slot 252 may be a pair of slots 252. Slots 252 may be positioned opposite each other about piston 220 and/or chamber 236. Each end of shaft 250 may be received within a respective slot of slots 252. Shaft 250 may limit rotation of piston 220 within chamber 236. In particular, shaft 250 may engage second casing portion 234 at slots 252 to limit or prevent rotation of piston 220 within chamber 236, e.g., relative to first casing portion 232, during motion of piston 220 along the axial direction A. Springs 240 may extend between first casing portion 232 and shaft 250, e.g., along the axial direction A, within compartments 242. Bumpers 244 may be mounted to springs 240 in order limit chatter or other contact between springs 240 and first casing portion 232. Each bumper of bumpers 244 may be positioned on a respective end of each spring 240, e.g., within compartments 242 and at shaft 250. In another exemplary embodiment, shaft 250 may be attached to casing 234, and piston 220 may have a slot rather than having slot 252 of casing 234. Such exemplary configuration also assists with keeping cam followers 224 in alignment.

As shown in FIG. 13, pump 200 may include a cylindrical sleeve 260. Cylindrical sleeve 260 may be made of a smooth/polished inert material, such as stainless steel. Cylindrical sleeve 260 is disposed within first casing portion 232 at chamber 236 of first casing portion 232. Piston head 222 may be positioned within cylindrical sleeve 260. Thus, piston head 222 may reciprocate within cylindrical sleeve 260 during operation of pump 200. An O-ring 262 extends between first casing portion 232 and an end of cylindrical sleeve 260, e.g., along the axial direction A. O-ring 262 may assist with limiting leakage of working fluid at an axial gap between first casing portion 232 and cylindrical sleeve 260. Pump 200 may also include a pair of seals 264, such as O-rings. Each seal of seals 264 extends between piston 220 (e.g., piston head 222) and cylindrical sleeve 260, e.g., radially (perpendicular to the axial direction A). Seals 264 may assist with limiting leakage of working fluid at a radial gap between piston 220 and cylindrical sleeve 260.

First casing portion 232 may also define an inlet passage 238, e.g., for each of pistons 220. Inlet passage 238 is contiguous with chamber 236 and allows working fluid to flow into and out of chamber 236 during operation of pump 200. Conduits (not shown), such as one of lines 44, 46, 48 or 50, may be attached to casing 230 at inlet passage 238 in order to direct working fluid into and out of pump 200. Thus, pump 200 may be plumbed with conduits or other lines to regenerator housing 140, e.g., such that stages 130, 132 are in fluid communication with pump 200 via such conduits.

To assemble pump 200, pistons 220 and cylindrical sleeve 260 may be inserted into first casing portion 232 with O-ring 262 and seals 264. Pistons 220 may be positioned such that shafts 250 are received within slots 252, and springs 240 may be positioned within first casing portion 232 at compartments 242. Second casing portion 234 may then be inserted over pistons 220 and brought up against first casing portion 232, e.g., such that springs 240 are compressed within compartments 242. First and second casing portions 232, 234 may then be coupled to each other using any suitable method or mechanism, such as fasteners. In such a manner, pump 200 may be easily assembled and can provide a compact hydraulic displacement system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A pump for a heat pump system, comprising:
a cam having a bearing surface;
a piston extending between a piston head and a cam follower along an axial direction, the cam follower of the piston positioned on the bearing surface of the cam;
a casing comprising a first casing portion and a second casing portion mounted to each other, the first casing portion defining a chamber, the piston head of the piston disposed within the first casing portion at the chamber, the piston extending through the second casing portion between the piston head and the cam follower of the piston along the axial direction;

a spring disposed within the casing and coupled to the piston such that the spring urges the cam follower of the piston towards the bearing surface of the cam; and a shaft extending from the piston along a radial direction that is perpendicular to the axial direction, the second casing portion of the casing defining a slot that extends along the axial direction, the shaft received within the slot, the shaft engaging the second casing portion at the slot to limit rotation of the piston relative to the casing and maintain alignment between the cam follower on the bearing surface of the cam, the shaft being elongated along the radial direction relative to the axial direction.

2. The pump of claim 1, wherein the spring is one of a pair of springs, the first casing portion defining a pair of compartments, the compartments of the pair of compartments positioned opposite each other about the piston, the springs of the pair of springs disposed within a respective compartment of the pair of compartments.

3. The pump of claim 2, wherein the springs of the pair of springs extend between the first casing portion and the shaft along the axial direction.

4. The pump of claim 3, wherein the slot is one of a pair of slots, the slots of the pair of slots positioned opposite each other about the piston, each end of the shaft received within a respective slot of the pair of slots.

5. The pump of claim 3, further comprising a plurality of bumpers, each bumper of the plurality of bumpers positioned on a respective end of each spring of the pair of springs.

6. The pump of claim 1, further comprising a cylindrical sleeve disposed within the first casing portion at the chamber of the first casing portion, the piston head positioned within the cylindrical sleeve, the cylindrical sleeve formed of separate material from the first casing portion.

7. The pump of claim 6, further comprising an O-ring extending between the first casing portion and an end of the cylindrical sleeve along the axial direction.

8. The pump of claim 7, further comprising a pair of seals, each seal of the pair of seals extending between the piston and the cylindrical sleeve along a radial direction that is perpendicular to the axial direction.

9. The pump of claim 1, wherein the first casing portion defines an inlet passage that is contiguous with the chamber of the first casing portion.

10. A caloric heat pump system, comprising:

a regenerator housing defining a chamber;

a stage comprising a caloric material disposed within the chamber;

a pump operable to circulate a working fluid through the stage, the pump comprising a cam having a bearing surface;

a piston extending between a piston head and a cam follower along an axial direction, the cam follower of the piston positioned on the bearing surface of the cam;

a casing comprising a first casing portion and a second casing mounted to each other, the first casing portion defining a chamber, the piston head of the piston disposed within the first casing portion at the chamber, the piston extending through the second casing portion along the axial direction;

a spring disposed within the casing and coupled to the piston such that the spring urges the cam follower of the piston towards the bearing surface of the cam; and a shaft extending from the piston along a radial direction that is perpendicular to the axial direction, the second casing portion of the casing defining a slot that extends along the axial direction, the shaft received within the slot, the shaft engaging the second casing portion at the slot to limit rotation of the piston relative to the casing and maintain alignment between the cam follower on the bearing surface of the cam, the shaft being elongated along the radial direction relative to the axial direction.

11. The caloric heat pump system of claim 10, wherein the spring is one of a pair of springs, the first casing portion defining a pair of compartments, the compartments of the pair of compartments positioned opposite each other about the piston, the springs of the pair of springs disposed within a respective compartment of the pair of compartments.

12. The caloric heat pump system of claim 11, wherein the springs of the pair of springs extend between the first casing portion and the shaft along the axial direction.

13. The caloric heat pump system of claim 12, wherein the slot is one of a pair of slots, the slots of the pair of slots positioned opposite each other about the piston, each end of the shaft received within a respective slot of the pair of slots.

14. The caloric heat pump system of claim 12, further comprising a plurality of bumpers, each bumper of the plurality of bumpers positioned on a respective end of each spring of the pair of springs.

15. The caloric heat pump system of claim 10, further comprising a cylindrical sleeve disposed within the first casing portion at the chamber of the first casing portion, the piston head positioned within the cylindrical sleeve, the cylindrical sleeve formed of separate material from the first casing portion.

16. The caloric heat pump system of claim 15, further comprising an O-ring extending between the first casing portion and an end of the cylindrical sleeve along the axial direction.

17. The caloric heat pump system of claim 16, further comprising a pair of seals, each seal of the pair of seals extending between the piston and the cylindrical sleeve along a radial direction that is perpendicular to the axial direction.

18. The caloric heat pump system of claim 10, wherein the first casing portion defines an inlet passage that is contiguous with the chamber of the first casing portion.

* * * * *